Figure 2:
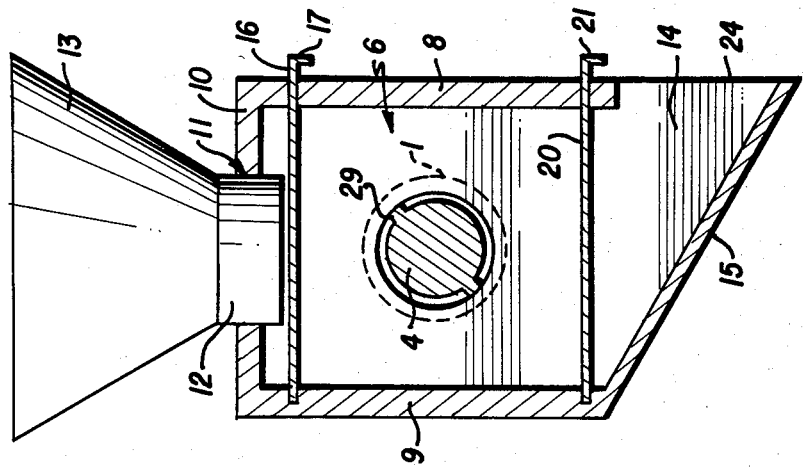

United States Patent [19]

Maillefer

[11] Patent Number: 4,491,418

[45] Date of Patent: Jan. 1, 1985

[54] PLASTICS EXTRUDER

[75] Inventor: Charles E. Maillefer, Buchillon, Switzerland

[73] Assignee: Maillefer S.A., Buchillon, Switzerland

[21] Appl. No.: 440,430

[22] Filed: Nov. 9, 1982

[30] Foreign Application Priority Data

Nov. 17, 1981 [CH] Switzerland .................. 7385/81

[51] Int. Cl.³ .............................................. B28C 7/04
[52] U.S. Cl. ...................................... 366/76; 366/79; 366/182; 425/208; 425/209
[58] Field of Search .......................... 366/69, 75-77, 366/79, 98, 99, 182, 192-193, 318; 425/207-209; 222/55, 135

[56] References Cited

U.S. PATENT DOCUMENTS

| | | | |
|---|---|---|---|
| 1,326,375 | 12/1919 | Spencer | 366/76 X |
| 3,822,737 | 7/1974 | Edwards | 366/193 X |
| 3,901,483 | 8/1975 | Lasar | 366/193 |
| 4,205,919 | 6/1980 | Attwell | 366/193 X |
| 4,334,784 | 6/1982 | Engels | 366/76 |

FOREIGN PATENT DOCUMENTS

| | | |
|---|---|---|
| 2024596 | 5/1970 | Fed. Rep. of Germany . |
| 880935 | 9/1982 | Fed. Rep. of Germany . |
| 1377457 | 6/1963 | France . |
| 612375 | 3/1977 | Switzerland . |

Primary Examiner—Timothy F. Simone
Attorney, Agent, or Firm—Parkhurst & Oliff

[57] ABSTRACT

The hopper of a screw communicates with a feed chamber situated upstream from the extruder cylinder. The substantially rectangular feed chamber is large enough so that the behavior of a mass of plastic material in its initial state, i.e., in the form of powder or pellets, is affected neither by the side-walls nor by the upper wall nor by the removable bottom of the chamber. Thus, in the case of pellets, the distance between any of those walls and the apex of the screw thread is appreciably greater than the average diameter of the pellets.

11 Claims, 2 Drawing Figures

U.S. Patent   Jan. 1, 1985   4,491,418

PLASTICS EXTRUDER

This invention relates to extruders, and more particularly to an extruder for plastic material of the type having a screw provided with a projecting thread of predetermined diameter, a cylinder disposed horizontally and exhibiting a bore fitted with a predetermined clearance to the diameter of the screw thread, and a hopper placed above the cylinder and intended to receive the plastic material in particles in an initial state.

Extruders are known to be machines essentially intended to work plastic material to put it into a state in which it can be shaped by passing through an extruder die or by being forced into a mold. Thus, they differ from machines designed to carry out operations for mixing various constituents or kneading operations. Machines of these latter types are described for instance, in German Patent No. 880,935 and in German Disclosed application (DOS) No. 2,024,596.

According to these prior disclosures, the hopper communicates with the jacket of an upstream zone of the machine, which compriese in one case an arrangement of large blades, integral with the upstream portion of the screw, and in the other case a piston integral with the screw, the latter being not only rotatable but also axially displaceable so as to compress the plastic material coming from the hopper against the upstream wall of the entrance of the cylinder.

In screw extruders of the type initially mentioned, the cylinder generally has at its upstream end a rectangular, square, or round opening or a vertical tubular coupling; and the hopper, usually of sheet metal, is fixed in this opening or coupling. In certain cases, the feed opening is laterally offset relative to a vertical plan containing the axis of the screw, or else a spiralling part is provided in the cylinder for guiding the mass of plastic granules which is gradually carried along by the screw into the bore of the cylinder.

Figure 1:
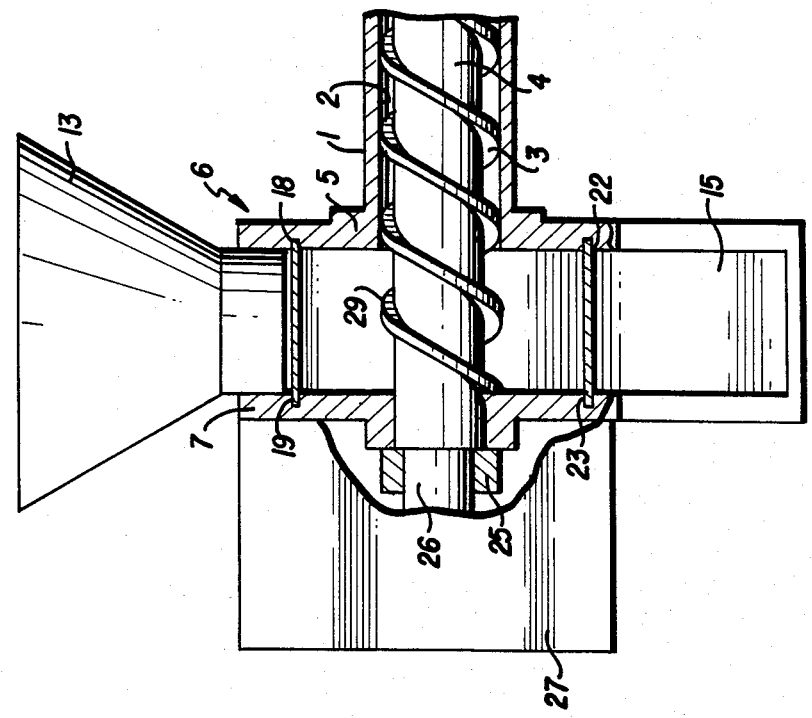

For example, FIG. 1 of Swiss Patent No. 612,375 shows that the inside dimensions of the cylinder in the zone where it is coupled to the hopper are on the same order as those of the cylinder bore.

Because of the asymmetrical shape of the space from which the plastic pellets or powder in their initial state are carried into the cylinder, the screw is subjected to a lateral thrust which, in many cases, cannot be absorbed by the bearing or bearings, so that at certain locations the threads of the screw press against the inside surface of the cylinder. This leads to gradual wear and tear on the parts and, consequently, to a variation of the clearance between the movable and fixed parts of the extruder.

To remedy this shortcoming, an extruder disclosed in French Patent No. 1,377,457 comprises, in its upstream portion situated beneath the hopper, two cylinder elements which are laterally movable relative to the upstream portion of the screw. Once the material in the hopper has entered between these cylinder parts, the latter are moved toward one another, compressing the load of plastic material against the core of the screw between the turns of its thread. Hence the operation of this extruder is essentially discontinuous.

In conventional continuously-operating extruders the small size of the usual feed openings causes another very disturbing phenomenon to appear: the output of the extruder is subject to timing irregularities, called pulsations. The output varies with each revolution of the screw, so that the extrudate exhibits longitudinal waves. Nowadays, however, when high precision is required in many cases, such conventional extruders are unsuitable.

The pulsations of the output are produced when the screw-thread passes near the walls, especially the bottom, of the feed opening. The mass of pellets held between the core of the screw, the thread of the screw, and the bottom of the feed opening is pushed downstream in the cylinder. When, on the contrary, the thread of the screw is at the top of the feed opening, it displaces a mass of pellets free to move in any direction. Pressure sensors mounted along the cylinder show periodic variations with the rotation of the screw.

It is an object of this invention to provide a screw extruder of the type initially mentioned which is designed to permit continuous and absolutely steady production of homogenized plastic material while avoiding the shortcomings described above.

To this end, the extruder for plastic material according to the present invention comprises a feed chamber situated beneath the hopper, communicating therewith, and bounded by an arrangement of fixed walls, the latter being disposed symmetrically relative to a vertical plane containing the common axis of the screw and of the cylinder, surrounding an upstream portion of the screw, having inside surfaces parallel to the mentioned axis, and situated at a distance from the screw thread which is greater at all points than the clearance between the thread and the cylinder bore and is sufficient so that the walls bounding the feed chamber do not exert any influence upon the particles of plastic material contained in the feed chamber.

In this arrangement, the pellets are pushed downstream under conditions such that, except for the force of gravity which is negligible here, the position of the screw thread is irrelevant. Thus there is a steady thrust of the pellets downstream, whatever the angular position of the screw may be.

A preferred embodiment of the invention will now be described in detail with reference to the accompanying drawing, in which FIGS. 1 and 2 are longitudinal and cross-sectional views of the up-stream portion of the extruder, respectively.

The extruder comprises a cylinder 1 containing a screw 4 formed of a core from which there projects a helical thread 3. In this embodiment thread 3 is a single thread of constant pitch; but it will be understood that screw 4 might equally well have any arrangement of single or multiple threads, of constant or varying pitch, the apex 29 of the thread or threads defining an imaginary cylindrical surface having a diameter less than that of the smooth, cylindrical inside surface 2 of cylinder 1, so that a clearance or clearances of predetermined width exist between the thread or threads of the screw and the inside surface 2 of cylinder 1. Cylinder 1 ends upstream in a plane wall 5 perpendicular to the common axis of screw 4 and cylinder 1. Wall 5 forms the downstream wall of a feed chamber 6 bounded upstream by a second plane wall 7 parallel to wall 5. Laterally, as maybe seen in FIG. 2, feed chamber 6 is bounded by two vertical walls 8 and 9, plane and parallel to the common axis of screw 4 and cylinder 1, while an upper part 12 of a hopper 13 of conventional design, which may be pyramid-shaped or conical and made of welded sheet metal Chamber 6 communicates at the bottom with a discharge passage 14 bounded by an inclined bottom 15 and by lower extensions of walls 5 and 7.

A first closure slide 16, made, for example, of a flat piece of sheet metal having its front edge 17 bent down, is fitted in horizontal grooves 18 and 19 made in the inside of walls 5 and 7. Slide 16, when engaged as shown in the drawing, closes the bottom opening of hopper 13, whereas it frees this opening when disengaged, so that the plastic pellets in hopper 13 can flow into chamber 6.

Furthermore, discharge passage 14 can be separated from feed chamber 6 by a second closure slide 20, likewise made of a flat piece of sheet metal having its front edge 21 bent down, this slide being fitted in grooves 22 and 23 in walls 5 and 7 below screw 4 but above an outlet 24 of passage 14.

As may be seen in the drawing, when removable bottom 20 of feed chamber 6 is in place, and slide 16 is open, chamber 6 and hopper 13 bound a space which can be completely filled with the plastic material intended to be processed by the extruder. This space is symmetrically shaped relative to a vertical plane containing the axis of screw 4; and the distance between any of the walls bounding chamber 6 and the outermost or apical surface of thread 3 of screw 4 is at all points greater than the size of the pellets. This distance will be several centimeters, for instance, whereas the size of the pellets is a few millimeters.

It may also be stated that the distance between the walls of chamber 6 and the apex 29 of thread 3 must be at least equal to or greater than the depth of thread 3. It has been found that under these conditions, the walls of chamber 6 do not affect the behavior of the particles contained in that chamber. The particles are carried along by the screw in an absolutely even and symmetrical manner without exerting any lateral thrust on the screw, regardless of the angular position of the screw.

Thus, cylinder 1 of the extruder may comprise, upstream from feed chamber 6, a bearing 25 guiding the rotation of a shaft 26 at the upstream end of screw 4. As the main purpose of bearing 25 is to ensure fluid-tightness, it need not absorb any great axial thrust being exerted on screw 4. Thread 3 of screw 4 continues into feed chamber 6 without any change as compared with the arrangement to be found in cylinder 1. Thus, apex 29 of thread 3 is contained in the same imaginary cylindrical surface as the apex which defines the turns of thread 3 in cylinder 1. As may be seen in FIG. 1, thread 3 extends axially up to wall 7, where the opening intended for screw 4 to pass through is fitted to the diameter of the core of that screw.

Frame 27 of the drive means encloses, as is normal, e.g., a multiple-groove pulley for driving screw 4 by means of a motor and belts or, as a modification, gearing.

The presence of a large, symmetrical feed chamber upstream of the extruder not only ensures the elimination of lateral thrust on the screw but also presents other advantages. Thus, the arrangement described makes it possible, owing to the removable bottom 20 communicating with discharge passage 14, and to slide 16 closing hopper 13, to carry out more easily than heretofore certain operations which take place during operation of the extruder. Thus, in particular, when it is necessary to change materials or to modify certain characteristics of the plastic material introduced into the machine, e.g., to change the colorant it contains, the moment at which this change takes place can be determined with great accuracy since the feed chamber can be completely emptied of the material it contains, and the latter can be replaced by the new plastic material or by material mixed with the new colorant. In this way, the product collected in the extrusion head placed at the exit of the extruder exhibits a color change at a precisely determined location.

What is claimed is:

1. A screw extruder comprising a cylinder having a cylindrical bore of substantially circular cross-sectional shape with an axis, a hopper arranged above said cylinder at an entry end thereof, guiding means for providing communication between said hopper and said bore and a screw coaxially disposed within said bore, said screw having a projecting thread of a predetermined diameter fitted to the internal diameter of said bore with a predetermined clearance, said screw being rotatably driven in a continuous manner and being held in a substantially fixed and predetermined axial position in order to displace material provided in said hopper, said screw thus moving the material into and through said bore, wherein said guiding means comprises a feed chamber situated beneath said hopper and bounded by a plurality of fixed walls disposed generally symmetrically relative to a vertical plane containing the common axis of said screw and said bore, said walls including side and bottom surfaces disposed generally parallel to said common axis and a downstream transverse surface disposed generally perpendicular to said common axis, said transverse surface extending between said side surfaces, said bore opening into said transverse surface, a downstream outlet wall of said hopper being aligned with said downstream transverse surface, the distance between said bore opening and said side and bottom surfaces being greater in all directions than said predetermined clearance between said diameters of said thread and said bore respectively, whereby the introduction into said cylinder of said material received in said feed chamber remains unaffected by said walls.

2. The extruder of claim 1, wherein said downstream surface of said walls bounding said feed chamber is plane, vertical, and perpendicular to said common axis, said bore opening into said downstream one of said walls.

3. The extruder of claim 1, wherein said feed chamber is of rectangular cross-section.

4. The extruder of claim 3 for plastic material in the form of pellets, wherein a distance between said walls and said thread is a multiple of the size of said pellets.

5. The extruder of claim 1, further comprising a closure means disposed horizontally between said hopper and said feed chamber, said closure means comprising a plate slidable between a position in which said hopper is open and a position in which said hopper is closed.

6. The extruder of claim 1, wherein said feed chamber comprises a removable bottom in the form of a plate slidable between a position in which said feed chamber is open at the bottom and a position in which said feed chamber is closed at the bottom.

7. The extruder of claim 6, further comprising a passage situated beneath said feed chamber, said removable bottom constituting a means for separating said feed chamber and said passage.

8. The extruder of claim 1, further comprising a shaft portion secured to the upstream end of said screw, a single bearing being disposed upstream from said feed chamber for guiding said shaft portion.

9. A screw extruder comprising:

a cylinder having a cylindrical bore of substantially circular cross-sectional shape with a horizontal axis, a hopper arranged above said cylinder at an entry end thereof and having a bottom opening, a feed chamber provided at said entry end of said cylinder for receiving particulate material provided in said hopper and fed to said chamber through said bottom opening, said feed chamber having a downstream transverse wall and side and bottom wall portions; and a screw coaxially disposed within said bore and said chamber, said screw having a projecting thread of a predetermined diameter fitted to the internal diameter of said bore with a predetermined clearance, said thread extending throughout said chamber with said predetermined diameter, said screw being rotatably driven in a continuous manner and being held in a substantially fixed and predetermined axial position in order to displace particulate material provided in said hopper, said screw thus moving the particulate material into and through said bore, said downstream wall of said feed chamber extending to said bottom opening of said hopper and extending vertically and transversely to said cylinder axis, said downstream wall having said cylindrical bore opening therein, said side and bottom wall portions extending longitudinally with respect to said axis at a distance which surpasses in all directions the radius of the bore by more than said clearance, said transverse wall and side and bottom portions determining for said feed chamber a shape substantially symmetrical with respect to a vertical plane that includes said axis so that portions of said particulate material which lie between two successive turns of said thread within said feed chamber are driven and introduced into said bore under equal conditions regardless of their angular locations with respect to said vertical plane.

10. The screw extruder of claim 9, wherein the distance between the walls bounding the feed chamber and an apex of the screw thread is at all points greater than the size of the particulate material.

11. The screw extruder of claim 9, wherein the distance between the walls bounding the feed chamber and an apex of the thread is greater than the depth of the thread.

* * * * *